INVENTOR.
THERIDES V. BARNARD.
BY John C. Baisch
ATTORNEYS.

March 14, 1939.　　T. V. BARNARD　　2,150,888
CORN POPPER
Filed Feb. 21, 1938　　2 Sheets-Sheet 2
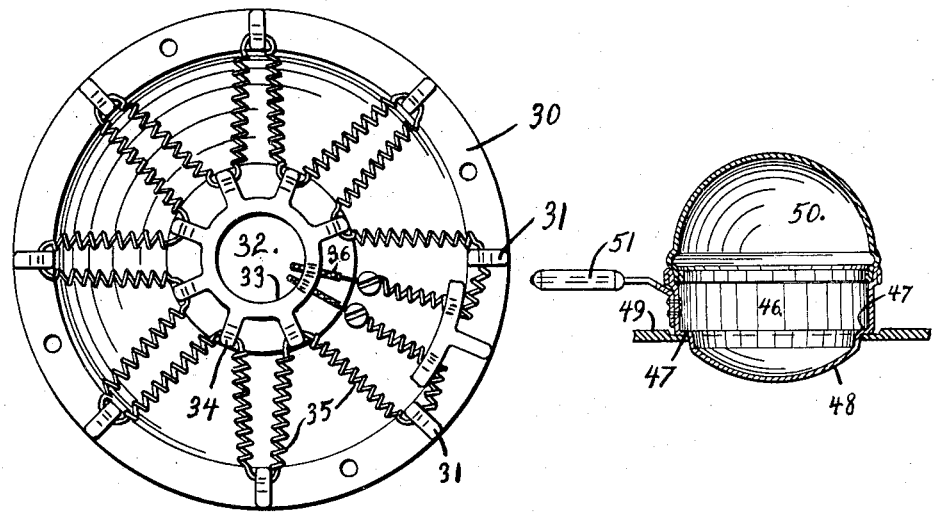
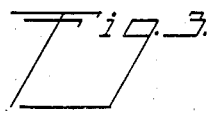
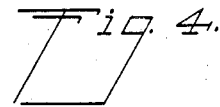
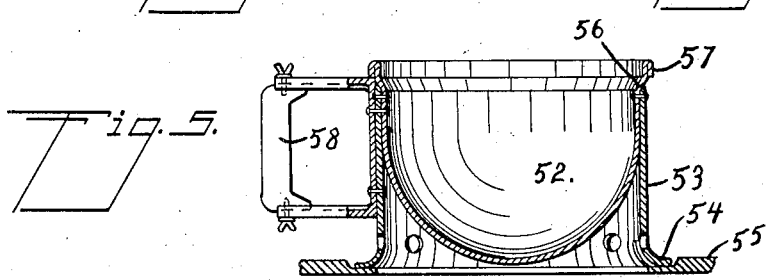
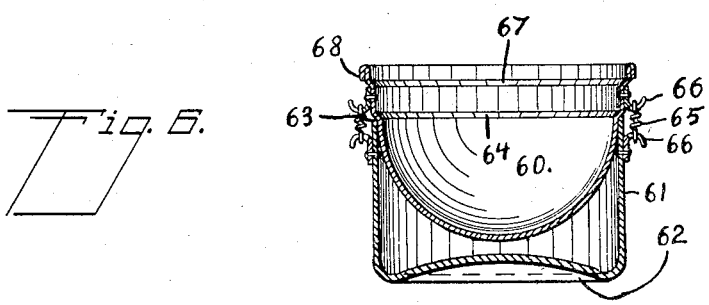
INVENTOR.
THERIDES V. BARNARD.
BY John C. Baisch
ATTORNEYS.

Patented Mar. 14, 1939

2,150,888

UNITED STATES PATENT OFFICE 2,150,888

CORN POPPER

Therides V. Barnard, Omaha, Nebr.

Application February 21, 1938, Serial No. 191,666

4 Claims. (Cl. 53—4)

This invention relates generally to corn poppers and particularly to improvements in a device for popping corn and for use as a general household utensil.

It is an important object of my invention to provide a device of this character adapted to be used in connection with a heating unit or on a stove or range for popping corn, or for cooking and general usage as a cooking utensil and is characterized by the novelty of the design, durability, attractiveness and inexpensiveness of construction; by the generally hemispherical cover having an annular bead pressed therein for limiting the depth of the extension of the cover into the bottom; by an annular shoulder adjacent the side of the bottom; by a hemispherical bottom; by a cylindrical casing provided with an expanded base and having its upper edge secured to the bottom member by welding; by an electrical heating unit having a depressed pan shaped base secured within the casing; by means removably securing the heating unit in the base; by improved means for securing the resistance or heating element in the unit; by improved means for increasing the intensity of the heat in the heating unit and to concentrate heat on the bottom of the cooker adjacent the shoulder formed therein; by a novel detachable adjustable handle secured to the wall of the bottom member and the casing; by a handle on the cover for lifting same; by detachable agitating means positioned in the top of the hemispherical cover; by suction cups for holding the device to a surface on which same is placed; and by means for releasably securing the bottom and the casing together.

With the above and other objects in view my invention consists in the construction, design and arrangement of the parts thereof whereby the objects sought are attained. Some changes may be made in the construction and arrangement of the parts without departing from the spirit and scope of the invention hereinafter described in connection with the accompanying drawings.

Referring to the drawings:

Figure 3 is a plan view of the heating element and retaining member.

Figure 4 is a side view of a modified embodiment of the device adapted to be placed in an opening of a stove or range after the cover for said opening has been removed.

Figure 5 is a side view of another modification of the device adapted to be placed in the opening of a stove or range similarly as in the form shown in Figure 4.

Figure 6 is a side view of still another modification of the invention.

Figure 2:
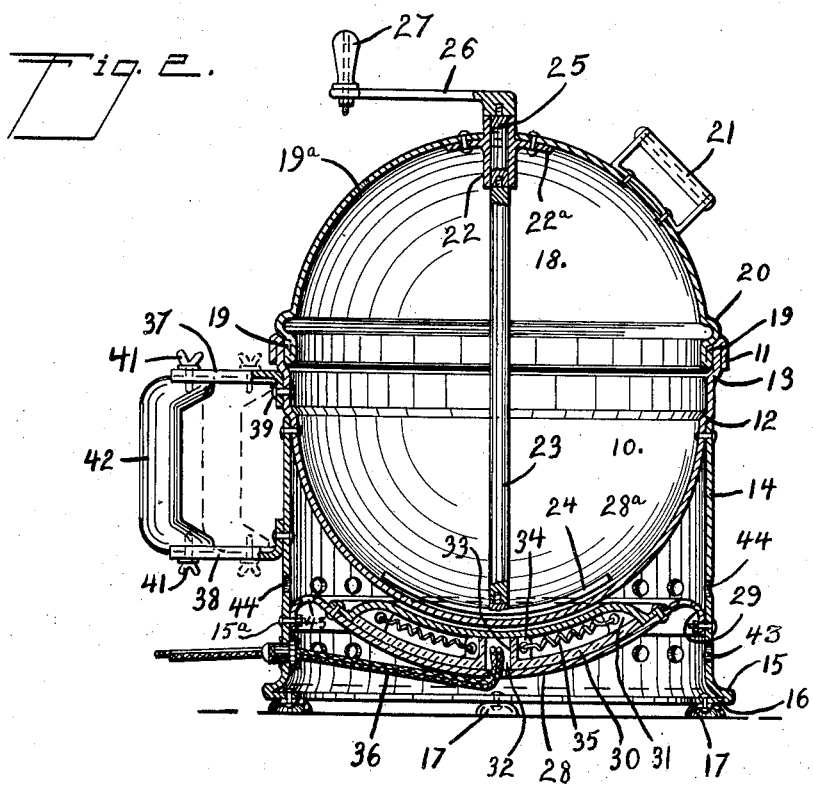
Figure 2 is a vertical section through the device taken on line 2—2 of Figure 1.
Figure 1:
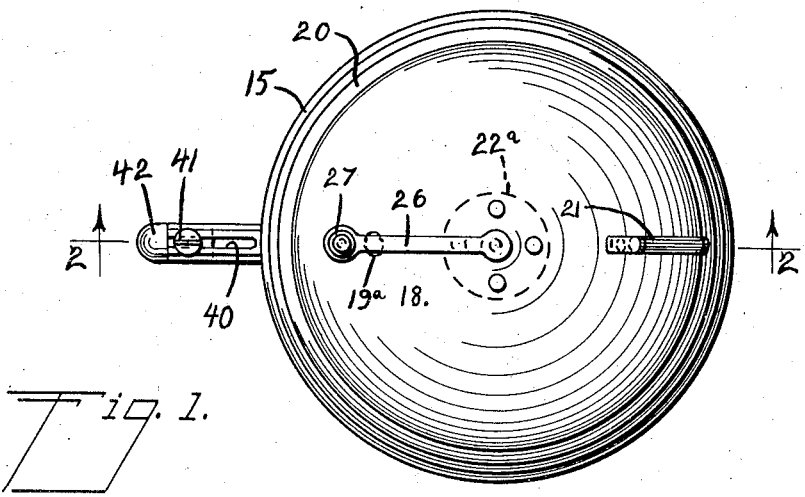
Figure 1 is a plan view of my invention.

Referring more particularly to Figures 1, 2 and 3, reference numeral 10 indicates a hemispherical bottom for the cooker, the free edge 11 of which is outwardly downturned. The upper portion of the bottom is pressed outwardly to provide a shoulder 12 and above said shoulder 12 and the upper edge of the bottom is a second shoulder 13. The bottom is secured in a cylindrical casing 14 by rivets or welding, the upper edge of said casing abutting against the shoulder 12 of the bottom which depends within said casing with the under side spaced upwardly of the lower edge of said casing. The lower edge of the casing flares outwardly at 15 and is turned inwardly at 16. Inverted rubber cups 17, riveted to the inturned portion 16 of the casing, supports said casing. The cover 18 is hemispherical in general shape and the free edge portion 19 is turned outwardly and back and is adapted to be received in the upper portion of the bottom. An outwardly pressed annular bead 20 adjacent the open side of the cover limits inward extension thereof into the bottom and aids in forming a close fit between said bottom and cover. A vent hole 19a is provided in the cover for the escape of steam while corn is being popped. A handle 21 is riveted to the cover for removing same and said cover is provided with a central opening at the top in which is received a bearing 22 having an outwardly extending flange 22a which is suitably riveted to said cover.

A vertical agitator depends in the cooker and comprises a vertical shaft 23 having curved laterally extending arms 24 thereon which are substantially parallel with the inner contour of the bottom and normally positioned adjacent said bottom in slightly spaced relationship. Shaft 23 has an extension of reduced size on its upper end, the end 25 being received in the bearing 22 and said extension being threaded and having crank arm 26 screwed thereon. The lower end of the shaft 23 is longitudinally bored and tapped and a centrally threaded portion of the agitator arms is screwed into said tapped bore. The crank arm 26 is provided with a knob or handle 27 secured to the free end thereof for turning the agitator. The various parts of the agitator may be unscrewed and same removed if desired.

The electrical heating unit comprises a depending concavo-convex base 28 having the marginal portions 29 turned downwardly and secured to the inner side of the casing 15 by bolts 15a. An electrical heating element retainer 30 of porcelain, shaped to conform to the shape of the base 28 in which it is received is provided with marginal upstanding lugs 31. The heating element retainer has a central opening 32 about which is an upstanding flange 33 with radial lugs 34. A coiled electrical heating element of suitable resistance wire 35 is radially attached between the lugs 31 and 34 being received in suitable openings in said lugs. Suitable lead wires 36 carry current to the wire 35. A cover plate 28a is riveted to the base 28, said plate 28a enclosing the heating element and being positioned adjacent the under side of the bottom 10.

An adjustable handle is provided for the lower portion of the cooker and comprises vertically spaced channeled brackets 37 and 38, the flanges of said brackets flaring laterally relative to the length thereof. Bracket 37 is secured adjacent the upper portion of the bottom by rivet 39 or may be welded thereto and bracket 38 is riveted to the casing 14. The open portions of the channeled brackets 37 and 38 face each other and both brackets have a longitudinal slot 40 in which are slidably received winged screws 41 which are threadably received in the respective ends of a handle 42 which is adapted to slide in the channels of the brackets toward and away from the casing and bottom of the cooker. The handle may be adjusted as to the distance thereof from the casing and bottom and the screws 41 are adapted to retain same in desired adjusted positions. The casing is provided with openings 43 therein below the heating unit and with openings 44 above the unit. The heating unit base is provided with openings 45 and said openings 43, 44 and 45 permit circulation of air through the lower portion of the casing below the bottom 10 and also permit heating of the upper portion of said bottom by hot air rising from the heating unit.

Referring to the device disclosed in Figure 4 the cooker comprises a bottom 46 having an inwardly extending shoulder 47 formed therein and a depending pan-shaped portion 48 which is adapted to depend in the opening of a stove or range 49, shoulder 57 resting on the marginal portion of said opening. A cover 50 of general hemispherical shape is provided and a handle 51 is riveted to the bottom 46.

The device illustrated in Figure 5 has a bottom 52 which depends in a casing 53 having an outwardly flared lower edge portion 54 adapted to rest on the marginal portion of a stove opening in stove 55. The upper edge of casing 53 abuts against an outwardly pressed shoulder 56 of the bottom and the casing and bottom are riveted or welded together. The upper edge portion 57 of the bottom is turned outwardly and downwardly. An adjustable handle 58, constructed similarly to the handle shown in Figures 1 and 2 is riveted to the casing.

The device disclosed in Figure 6 comprises a generally hemispherical bottom 60 depending in a cylindrical casing 61. The casing is provided with an upwardly bulging bottom 62 and the upper edge 63 abuts against an outwardly pressed shoulder 64 of the bottom 60. The casing and bottom member 60 are secured together by springs 65 having the respective ends thereof secured on hooks 66 riveted to the casing and bottom member 60 respectively. The bottom 60 is provided with a second outpressed shoulder 67 above shoulder 64 and the upper free edge portion 68 is outwardly and downwardly turned.

It is thought that the invention and many of its attendant advantages will be understood from the foregoing description and it will be apparent that various changes may be made in the form, construction and arrangement of the parts without departing from the spirit and scope of the invention or sacrificing all of its material advantages.

Having thus described my invention what I claim is:

1. In a device of the class described, a hemispherical bottom member having an annular expended shoulder adjacent the rim thereof, a cylindrical casing in which the bottom member depends, said shoulder of the bottom member resting on the top edge of the casing and said bottom member and casing being secured together, a hemispherical cover having a central opening in the top thereof and a steam vent at one side, a handle on the cover, a bearing received in the central opening of the cover and secured therein, agitating means operably mounted in said bearing and depending into the bottom member, a handle on the casing and bottom member, a concavo-convex electrical heating unit positioned adjacent to the under side of the bottom member and substantially parallel therewith, said unit including a base plate having a downturned marginal portion adapted to contact the inner wall of the cylindrical casing and having openings therein, and bolts received in the openings of the downturned portion of the plate and in registered openings in the casing whereby the heating unit is detachably secured in said casing.

2. In a device of the class described, a hemispherical bottom member having an annular expanded shoulder adjacent the rim thereof, a cylindrical casing in which the bottom member depends, said shoulder of the bottom member resting on the top edge of the casing and welded thereto, a hemispherical cover having a central opening in the top thereof and a steam vent therein, a handle on the cover, a bearing received in the central opening of the cover, said bearing having a laterally extending annular flange secured to the cover, agitating means operably mounted in said bearing and depending into the bottom, a handle on the casing and bottom member, a concavo-convex electrical heating unit positioned adjacent the under side of the bottom member and substantially parallel therewith, said unit including a base plate having a downturned marginal portion adapted to contact the inner wall of the cylindrical casing, said casing having openings therein above and below the electrical unit and the base plate of said unit having openings therethrough whereby circulation of air is effected from below the unit into the space between the unit and bottom member within the casing, and removable means for securing the plate to the casing.

3. In a device of the class described, a hemispherical bottom member having an annular expanded shoulder adjacent the rim thereof, a cylindrical casing in which the bottom member depends, said shoulder of the bottom member resting on the top edge of the casing and secured thereto, a hemispherical cover having a central opening in the top thereof and a steam vent therein, a handle on the cover, a bearing received in the central opening of the cover, said bearing having a laterally extending annular flange secured to the cover, agitating means operably mounted in said bearing and depending into the bottom, a handle on the casing and bottom member, a concavo-convex electrical heating unit positioned adjacent the under side of the bottom member and substantially parallel therewith, said unit including a base plate having a downturned marginal portion adapted to contact the inner wall of the cylindrical casing, said base plate being detachably secured to the casing, said casing having openings therein above and below the electrical unit and said base plate having openings therethrough to permit passage of air into the upper portion of the casing, and an outwardly flaring flange adjacent the bottom of the casing.

4. A structure as set forth in claim 3 including inverted suction cups secured to the casing and supporting the device.

THERIDES V. BARNARD.